TEST TAPE WITH PRESELECTED SKEW

Filed April 11, 1968 2 Sheets-Sheet 1

INVENTOR
ROBERT LEVIN
BY Samuel Cohen
ATTORNEY

INVENTOR
ROBERT LEVIN
BY [signature]
ATTORNEY

United States Patent Office 3,508,231
Patented Apr. 21, 1970

3,508,231

TEST TAPE WITH PRESELECTED SKEW

Robert Levin, Cherry Hill, N.J., assignor to RCA Corporation, a corporation of Delaware Filed Apr. 11, 1968, Ser. No. 720,714
Int. Cl. G06f *11/00;* G11b *5/46, 15/46*
U.S. Cl. 340—174.1 5 Claims

ABSTRACT OF THE DISCLOSURE

A method of placing information on a magnetic test tape employed to measure the sensitivity of a tap station to "skew" distortion. A plurality of bits, not more than one of which represents a given binary value, and the others of which represent the other binary value, is recorded along a length of track normally sufficient for the storage of only a single bit. By appropriately choosing the position of the bit representing the given binary value, skew, in a precise measurable amount is simulated.

BACKGROUND OF THE INVENTION

Magnetic tape stations are commonly employed for storing large numbers of coded characters, sometimes termed "bytes," on multiple track tapes. Ideally, the bits representing magnetically recorded characters should be aligned on the magnetic tape in a direction perpendicular to the transverse axis of the tape so that when the tape is read, the bits of a recorded character all are read simultaneously. However, various factors, broadly designated as skew, sometimes prevent this ideal from being achieved, particularly at high tape speeds and/or high recording densities.

The phenomenon known as skew may be defined as the difference in times of occurrence among several read back bits of a character. Among the factors contributing to the problem of skew are misalignment between the read-write heads and the tape during the recording and reproducing operations, variations in tape speed, high frequency jitter, defects in the magnetic properties of the tape, and electrical skew, the latter resulting from variations in the characteristics of the write and other electrical circuits. At high bit packing densities, a bt of a character in one track may be from a fraction of a bit to one bit behind the corresponding bit of the same character in another track.

Modern tape stations include means for compensating for a certain amount of skew distortion and it is sometimes necessary, in the field, to determine whether these compensation circuits are operating properly and, in general, whether the tape station will continue to provide error-free performance in the presence of limited amounts of skew distortion. The object of this invention is to provide a method for placing information on a magnetic test tape which may be used as a standard and which, when read by the tape station, can be employed to measure the sensitivity of the various channels of the tape station to different, known-in-advance amounts of skew distortion.

SUMMARY OF THE INVENTION

A method of recording information on a magnetic tape of the type which normally stores solely a single bit in each length X of a recording track comprising the step of simulating the recording of $n$ such bits in this length X of track, where $n$ is an integer greater than 2 and at least $n-1$ of said bits represent one binary value, and choosing the position of the bit which represents the other binary value (when such a bit is present) to simulate skew distortion in track length increments $aX/n$, where $a$ is some integer from 0 to $n$.

DETAILED DESCRIPTION

A tape system which is presently commercially available records information at a frequency of $60\times10^3$ bits per second at a tape speed of 75 inches per second. The bit packing density along each track of this tape is $60\times10^3\times1/75=800$ bits per inch. In other words, each bit is recorded in a length of track $1.25\times10^{-3}$ inches.

Figure 2:
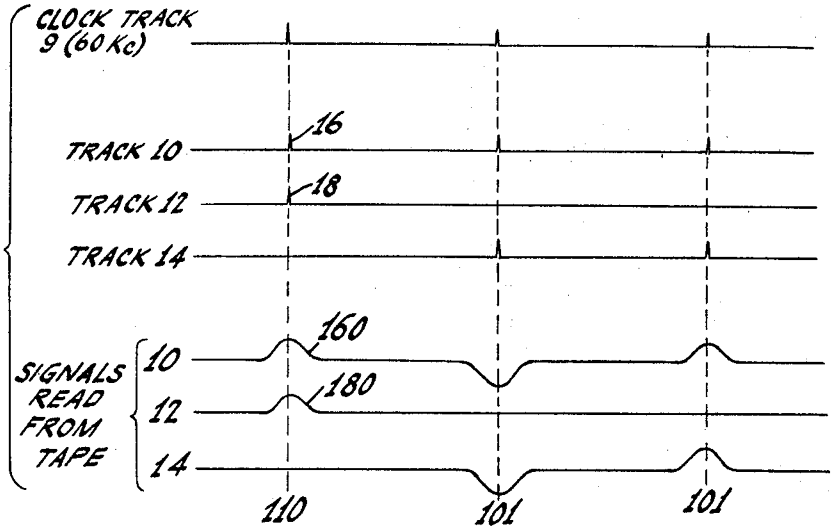
FIGURE 2 is a schematic showing of the way in which information is written on and read from a conventional magnetic tape.

FIG. 2 shows schematically portions of the clock track 9 and of three information tracks 10, 12 and 14 of a tape of this type. Track 10 stores the bits 111, track 12 the bits 100 and track 14 the bits 011. As mentioned in the introduction, each "character" or "byte" is read in a direction transverse to the tape length. The electrical signals produced during such read out are shown in the lower three waveforms in FIG. 2. Note that the signals have a polarity, plus or minus, dependent upon the sense of the change in flux, however, a signal of either polarity represents a 1. The first three bits of the first character are 110, the first three bits of the second character are 101 and so on.

The bits of each character are aligned, that is, there is to skew distortion present in the tape of FIG. 2. In other words, the change in flux on the tape represented by pulse 16 on track 10 is precisely aligned with the change in flux represented by pulse 18 of the coresponding bit on track 12. Skew distortion manifests itself as a displacement, in the track direction, of the bit on one track relative to the corresponding bit of the same character on the next adjacent track. For example, if the flux transition, represented by 18, is not aligned with the flux transition represented by 16, this is skew distortion of the bit on track 12 relative to the corresponding bit on track 10 and results in differences in the times of occurrence of the corresponding signals 160 and 180 read from the tape.

One method of testing a tape station for its sensitivity to skew distortion is to pre-record a tape with different, known-in-advance amounts of skew distortion in the different tracks of the tape. Such a tape is then run on the station and, by appropriately programming the computer running the tape, it is possible to determine the amounts of skew distortion the tape station successfully can cope with, without error. If the tape station is found not to be able to compensate for a desired amount of skew distortion, certain adjustments can be made at the tape station to improve the operation of the tape station in this respect.

The present invention relates to a method of fabricating such a test tape. This is done in the way shown in FIG. 3. In each incremental length X of track along which a single bit is normally recorded, the recording of an $n$ bit word is simulated, where $n$ is some number greater than 2 and preferably some large number, say from 5 to 32 or more. Along track 10*a*, there is a thirty-two bit word A shown within the bracket. This is the length ($X=1.25\times10^{-3}$ inches) of track which formerly contained only a single bit. All except one of these bits is a 0 so that, when read at normal tape speed (75 inches per second), the thirty-two bits appear to the read circuits to be a single bit 1. Following the first thirty-two bit word, there is a second thirty-two bit word B which consists of a 1 followed by thirty-one zeros. This word also produces a signal indicative of a single one when read at normal tape speed. On track 12*a* in the word B position there are thirty-two zeros. This simulates a 0 when read at normal tape speed, and so on.

Figure 3:
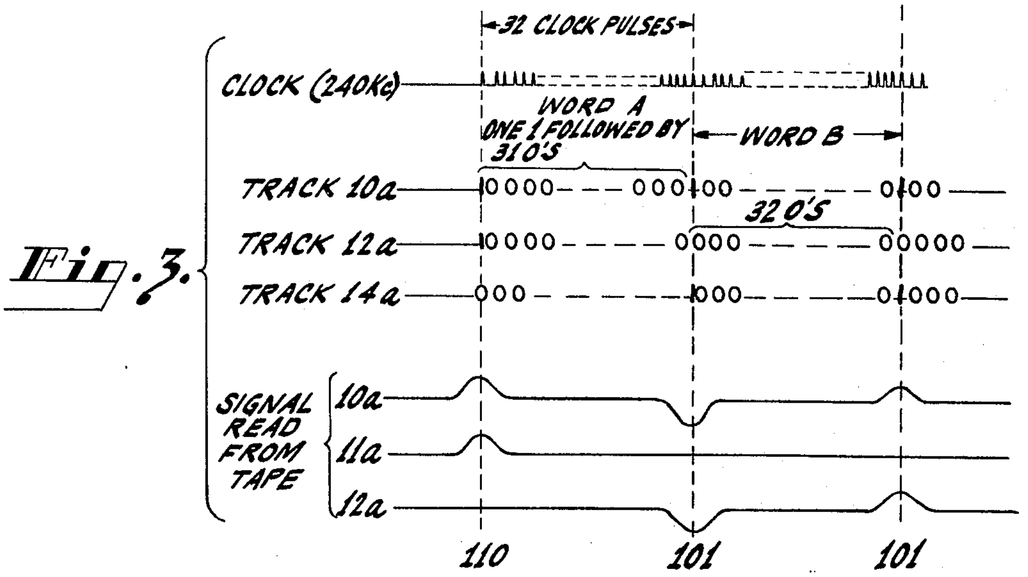

As may be observed from the last three waveforms of FIG. 3, the information recorded exhibits no skew distortion. However, by changing the position of the bit 1 in the recorded word, skew distortion in precise amounts readily may be introduced.

Figure 4:
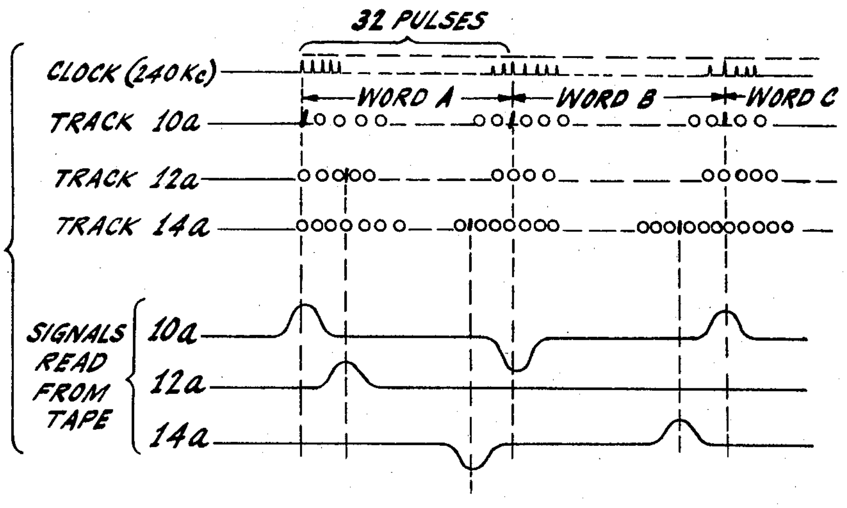
FIGURES 3 and 4 are schematic showings of the way in which a magnetic tape is writen and read according to the present invention.

The above is shown in FIG. 4. There, the track 10*a* exhibits no skew distortion and may be considered the reference track. In the track 12*a*, the bit 1 of the thirty-two bit word which is recorded as word A, occurs as the fourth bit of the word. Thus, when read back, the electrical signal representing this bit appears to be delayed relative to the corresponding bit of the same character recorded on track 10*a*, $4/32$ of the normal one bit track increment, that is, $4/32 \times 1.25 \times 10^{-3}$ inches or approximately $0.16 \times 10^{-3}$ inches. The thirty-two bit word recorded on track 14*a* have the bit 1 recorded in the twenty-eighth bit position. Here, the skew distortion can be thought of as $4/32$ of a track increment in the minus direction or alternatively as $28/32$ of a bit in the plus direction.

The test tapes shown in part in FIGS. 3 and 4 may be made in one of three different ways. The magnetic tape may be slowed down or the writing speed may be increased, or the tape may be slowed down and the writing speed increased. To give an example of the last method, if the tape speed is reduced by a factor of eight so that it is 9⅜ inches per second rather than 75 inches per second and the write freqeuncy is increased by a factor of four so that it is $240 \times 10^{-3}$ bits per second rather than $75 \times 10^{3}$ bits per second, the simulated bit packing density will be $25.6 \times 10^{3}$ bits per inch, a factor of thirty-two increase over the 800 bits per inch packing density for the tape of FIG. 2. When reading tape, it is driven at normal speed (75 inches per second) and since there is no more than a single 1 recorded in each tape increment of $1.25 \times 10^{-3}$ inches, the bit packing density appears to the read circuits no different than that of the convenientally-recorded tape discussed in connection with FIG. 2.

Figure 1:
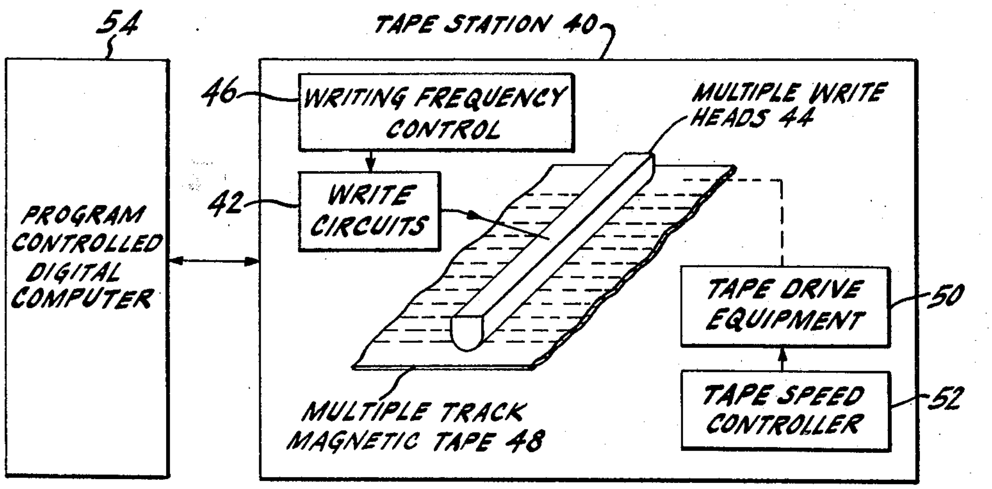
FIGURE 1 is a block diagram of a system for recording magnetic tape in accordance with the invention.

The system employed for writing a tape, according to the present invention, is shown in FIG. 1. It includes a standard tape station 40, certain parts of which are shown within the block. These include write circuits 42 connected to multiple write heads 44 and driven by write frequency control circuits 46. The write heads 44 are adjacent to a multiple track mangnetic tape 48. The tape is driven by tape drive equipment 50 and the speed of this equipment is controlled by a group of circuits legended tape speed controller 52. The writing of information onto the tape and the reading of information from the tape is all under the control of a digital computer of the program-controlled type, shown at 54.

In operation, the magnetic tape station may normally operate at a speed of 75 inches per second. The tape speed controller 52, in one practical form of the present invention, includes means for switching different values of resistors into the tape drive circuits for causing the tape drive capstan, for example, to operate at a speed one-eighth of its normal speed. Many other methods of controlling the tape speed are possible and are within the scope of the present invention. In a similar manner, the write frequency control circuit 46 simply may be a means for switching the writing speed from 60 kilohertz to 240 kilohertz. Tape stations are commercially available which have this capability, that is, the capability of writing at one of two different speeds.

The information to be written on the successive tracks is controlled in the normal fashion, that is, by appropriately programming the digital computer 52. This program may, for example, cause a tape to be recorded with successively greater amounts of skew introduced on the successive tracks. For example, the amount of skew introduced onto track 10 may be varied from $1/32$ of a bit to $2/32$ of a bit to $3/32$ of a bit and so on, first in the plus sense then in the minus sense and the same thing done for the other tracks.

The method of recording a tape, according to the present invention, is applicable to many forms of recording The illustration is meant to be perfectly general in this respect. For example, it is applicable to return to zero, non-return to zero, and other standard recording techniques.

What is claimed is:

1. A method of recording information on a magnetic tape of the type which normally stores solely a single bit in each length X of track comprising the steps of recording $n$ such bits in each length X of track, where $n$ is an integer at least equal to 5, and $n-1$ of such bits represent one binary value and one of said bits represents the other binary value and choosing the position of the bit representing said other binary value to simulate skew distortion in any desired track length increment from 0 to any integral multiple of $X/n$.

2. The method set forth in claim 1, wherein the greater number of bits than normal is obtained by driving the magnetic tape at a speed which is lower than its normal speed.

3. A method as set forth in claim 1, wherein the greater than normal number of bits is obtained by increasing the bit recording frequency to a value greater than the normal bit recording frequency.

4. A method as set forth in claim 1, wherein the greater than normal number of bits is obtained by both decreasing the tape driving speed from its normal speed and increasing the bit recording frequency from its normal frequency.

5. A method of recording information on a magnetic tape of the type which normally stores in each length X of track a single bit, which, when it represents one binary value is manifested as a change in magnetic flux direction on the magnetic tape, comprising the steps of:

simulating the generation of a binary word having $n$ times the number of bits normally recorded in said length x of track, said word consisting of one bit of said one value corresponding to a change in flux on the tape and $n-1$ bits of the other value, where $n$ is an integer greater than 2;

selecting, in accordance with the amount of skew distortion desired, the position of said bit representing said one value in said $n$ bit word; and recording said $n$ bit word in said length X of track.

References Cited

UNITED STATES PATENTS

| | | | |
|---|---|---|---|
| 3,172,096 | 3/1965 | Peake | 340—174.1 |
| 3,426,338 | 2/1969 | Gerding | 340—174.1 |

BERNARD KNOICK, Primary Examiner

VINCENT P. CANNEY, Assistant Examiner

U.S. Cl. X.R.

340—146.1